US010969499B2

(12) United States Patent
Naim

(10) Patent No.: US 10,969,499 B2
(45) Date of Patent: Apr. 6, 2021

(54) LUGGAGE TRACKING SYSTEM

(71) Applicant: PMF SPV LLC, Los Angeles, CA (US)

(72) Inventor: William Naim, Los Angeles, CA (US)

(73) Assignee: PMF SPV LLC, Los Angeles, CA (US)

( * ) Notice: Subject to any disclaimer, the term of this patent is extended or adjusted under 35 U.S.C. 154(b) by 0 days.

(21) Appl. No.: 16/607,059

(22) PCT Filed: Apr. 20, 2018

(86) PCT No.: PCT/US2018/028703
§ 371 (c)(1),
(2) Date: Oct. 21, 2019

(87) PCT Pub. No.: WO2018/195515
PCT Pub. Date: Oct. 25, 2018

(65) Prior Publication Data
US 2020/0200919 A1    Jun. 25, 2020

Related U.S. Application Data

(60) Provisional application No. 62/487,964, filed on Apr. 20, 2017.

(51) Int. Cl.
*G01S 19/47*    (2010.01)
(52) U.S. Cl.
CPC .................................. *G01S 19/47* (2013.01)
(58) Field of Classification Search
None
See application file for complete search history.

(56) References Cited

U.S. PATENT DOCUMENTS

| | | | |
|---|---|---|---|
| 7,791,455 B1 * | 9/2010 | MacLean, III | G01S 7/021 340/10.5 |
| 8,068,023 B2 * | 11/2011 | Dulin | B60P 3/03 340/539.11 |
| 8,253,557 B2 | 8/2012 | Ani et al. | |
| 9,002,641 B2 * | 4/2015 | Showering | G01C 21/165 701/469 |
| 9,129,167 B2 * | 9/2015 | Motley, III | G06K 7/10366 |
| 9,424,723 B2 * | 8/2016 | Dubarry | G08B 13/02 |
| 9,439,164 B2 | 9/2016 | Stewart et al. | |
| 9,523,775 B2 * | 12/2016 | Chakraborty | G01S 13/74 |
| 9,536,219 B2 * | 1/2017 | Zumsteg | G06K 7/10009 |

(Continued)

OTHER PUBLICATIONS

International Search Report and Written Opinion, PCT/US2018/028703, 7 pages (dated Oct. 10, 2018).

*Primary Examiner* — Steven Lim
*Assistant Examiner* — Muhammad Adnan
(74) *Attorney, Agent, or Firm* — Michael F. Fedrick; Loza & Loza, LLP

(57) ABSTRACT

A device, system, and method for tracking luggage in which the transmission of wireless signals by the device is turned off and on in response to sensor data, including the detection by a barometer of a decrease in atmospheric pressure of at least 13.8 kPa; lack of reception by a GPS receiver of a GPS signal and detection by an accelerometer and magnetometer of low frequency, low amplitude vibrations; and/or reception by a Bluetooth module of GPS coordinates transmitted by another luggage tracking device.

10 Claims, 3 Drawing Sheets

(56) References Cited

U.S. PATENT DOCUMENTS

| | | | |
|---|---|---|---|
| 9,544,075 B2* | 1/2017 | Altman | G01S 1/02 |
| 9,877,296 B2* | 1/2018 | Kelly | G06K 19/025 |
| 10,249,172 B2* | 4/2019 | Neravati | G08B 25/016 |
| 10,267,061 B2* | 4/2019 | Hage | G06Q 10/083 |
| 10,568,034 B2* | 2/2020 | Bean | G06F 1/3209 |
| 10,713,613 B2* | 7/2020 | Hage | G01D 21/02 |
| 2001/0052850 A1* | 12/2001 | Zimmerman | G06K 17/00 340/572.1 |
| 2003/0144985 A1* | 7/2003 | Ebert | G07C 9/28 340/539.27 |
| 2009/0230191 A1* | 9/2009 | Saperstein | G06Q 10/08 235/385 |
| 2009/0315704 A1* | 12/2009 | Rosing | G06Q 10/08 340/539.13 |
| 2014/0085055 A1* | 3/2014 | Lee | G06Q 10/08 340/10.5 |
| 2014/0151173 A1* | 6/2014 | Reh | A45C 5/03 190/18 A |
| 2014/0297218 A1* | 10/2014 | Yuen | G01C 5/005 702/141 |
| 2015/0106041 A1* | 4/2015 | Bess | G01M 7/00 702/56 |
| 2016/0020932 A1* | 1/2016 | Sornin | H04L 27/103 375/139 |
| 2016/0021491 A1* | 1/2016 | Milne | H04W 4/029 340/665 |
| 2016/0189507 A1* | 6/2016 | Rayner | A45C 13/18 340/572.1 |
| 2016/0255420 A1* | 9/2016 | McCleland | G01S 19/51 340/870.07 |
| 2016/0260261 A1* | 9/2016 | Hsu | B23K 9/173 |
| 2017/0074002 A1* | 3/2017 | Cooper | E05B 65/523 |
| 2017/0208426 A1* | 7/2017 | Komoni | H04W 4/80 |
| 2018/0241489 A1* | 8/2018 | Daoura | G08B 21/0269 |
| 2018/0322454 A1* | 11/2018 | Komoni | H04W 4/80 |

\* cited by examiner

LUGGAGE TRACKING SYSTEM

CROSS-REFERENCE TO RELATED APPLICATIONS

This application is the U.S. national stage of International Patent Application No. PCT/US2018/028703, filed on Apr. 20, 2018 and entitled LUGGAGE TRACKING SYSTEM, which claims the benefit of priority under 35 U.S.C. § 119(e) from U.S. Patent Application No. 62/487,964, filed Apr. 20, 2017. The disclosure of the foregoing applications is incorporated herein by reference in its entirety.

BACKGROUND

Lost luggage is an ongoing concern of many travelers. Luggage may become lost or misdirected in connection with air travel in particular. For example, if a traveler arrives late for a flight, there may not be time for the traveler's luggage to be loaded onto the same plane as the traveler, and the luggage may then fail to reach the traveler's destination. Late-arriving luggage may also fail to be loaded on the same plane as a traveler if the plane's cargo hold lacks sufficient space or if the plane has already reached its maximum takeoff weight. In addition, luggage may be misdirected if identifying tags become torn off.

Although the rate of lost and mishandled baggage associated with air travel has declined in recent years to less than 1% of airline baggage, the owner of such lost or misdirected luggage can take little comfort in this statistic. Devices for tracking personal luggage items have therefore been developed in order to address this issue.

Typical luggage tracking devices continuously take location readings and communicate this information via GSM, WiFi, or other wireless means to networked servers. Commercial aircraft regulations generally require that these trackers cease wireless communications before an aircraft leaves an airport gate, however, as such wireless communications have the potential to interfere with aircraft electronics. There remains a need therefore for improved luggage trackers which avoid such interference.

SUMMARY

The present luggage tracking device and method provide an improved system for tracking luggage which avoids interference with aircraft electronics and reduces energy requirements. In one embodiment, the present luggage tracking device comprises a communications module, a global positioning system (GPS) module capable of receiving GPS signals from one or more GPS satellites, a Bluetooth module capable of transmitting and receiving data using a Bluetooth standard, a barometer, a 3-axis accelerometer, a 3-axis magnetometer, computer memory, and a CPU in communication with all of the foregoing components. Optionally, an RFID sensor can also be included. These components can be implemented in an integrated circuit, or can be composed of separate circuits or devices which are placed in electrical communication.

The memory of the luggage tracking device includes stored instructions which, when executed by the CPU, operate to cease the transmission of data by the communications module and the Bluetooth module upon the occurrence of one or more of the following events:

(i) reception by the Bluetooth module of GPS coordinates transmitted by another luggage tracking device; or (ii) detection by the barometer of a decrease in atmospheric pressure of at least 2 pounds per square inch (13.8 kPa); or (iii) detection by the accelerometer and the magnetometer of vibrations having a frequency of between 5 Hz and 40 Hz, more preferably between 10 Hz and 30 Hz, and an amplitude of between 0.3 G and 0.7 G, more preferably between 0.4 G and 0.6 G; and lack of reception by the GPS module of a GPS signal from at least three satellites.

These events indicate that the present device has entered into a plane and therefore that transmission of wireless signals must be ended by the device, in particular by the communications module, which is configured to transmit and receive data with a mobile device over a cellular network, a wireless local area network, and/or a wireless wide area network. Preferably, the wireless local area network communications module operates using a WiFi standard, and if the device includes a wireless wide area network communication module, this preferably using a LoRa standard.

The present luggage tracking device can form part of a system which includes a mobile communications device, such as a mobile phone, and optionally a server or network of servers. The luggage tracking device is provided with communications modules which can communicate directly with a mobile device, such as through a Bluetooth communication, or over a network such as a cellular network. Data which is obtained by the sensors of the luggage tracking device can be provided to a mobile device of a user which operates software configured to receive and display such data, using a direct or networked connection. Alternatively, such sensor data can be provided over a communications network to a server, and the server can send such data on to a user's mobile device. A server can alternatively operate software which processes such data, and/or which displays such data to a browser or other software on the user's mobile device.

The present invention further comprises a method for turning off wireless communications of a luggage tracking device. Such devices periodically or continuously transmit wireless signals, and such transmission must be ended before a plane flight commences. In this method, a luggage tracking device detects vibrations with an accelerometer and/or a magnetometer, and also searches for GPS signals, preferably signals from at least 3 satellites. When the device detects vibrations having a frequency of between 5 Hz and 40 Hz and an amplitude of between 0.3 G and 0.7 G, and when the device fails to receive a GPS signal from at least 3 satellites, then the operating instructions of the device will cause it to cease transmitting wireless signals. A further signal, namely detection of the upward movement of the device, can be required to end wireless transmissions in an alternative embodiment. Alternatively or in addition, the transmission of wireless signals by the device can be ended when the luggage tracking device detects a decrease in atmospheric pressure of at least 2 pounds per square inch (13.8 kPa). The transmission of wireless signals by the device can also be discontinued when the device receives a Bluetooth signal comprising the GPS coordinates of another luggage tracking device, which would necessarily be in close proximity due to the limited range of Bluetooth signals.

The present invention additionally includes a method for turning on wireless communications of a luggage tracking device used for air travel. In this method, the device is configured to periodically determine atmospheric pressure, and upon detecting an increase in atmospheric pressure, such as an increase of 2 psi or a return to a predetermined air pressure (such as typical air pressure at sea level), an accelerometer and/or a magnetometer are activated to detect vibrations. When vibrations having a frequency of between 5 Hz and 40 Hz and an amplitude of between 0.3 G and 0.7 G are detected, a GPS module of the device is used to determine whether GPS signals are being received, preferably from at least 3 satellites. Upon determining that an appropriate GPS signal from at least 3 satellites is received, one or more communications modules of the luggage tracking device are activated to begin transmitting and receiving data over a cellular network, a wireless local area network, and/or a wireless wide area network in order to place the luggage tracking device in communication with a user's mobile device.

FIGURES

DESCRIPTION

Definitions

Figure 1:
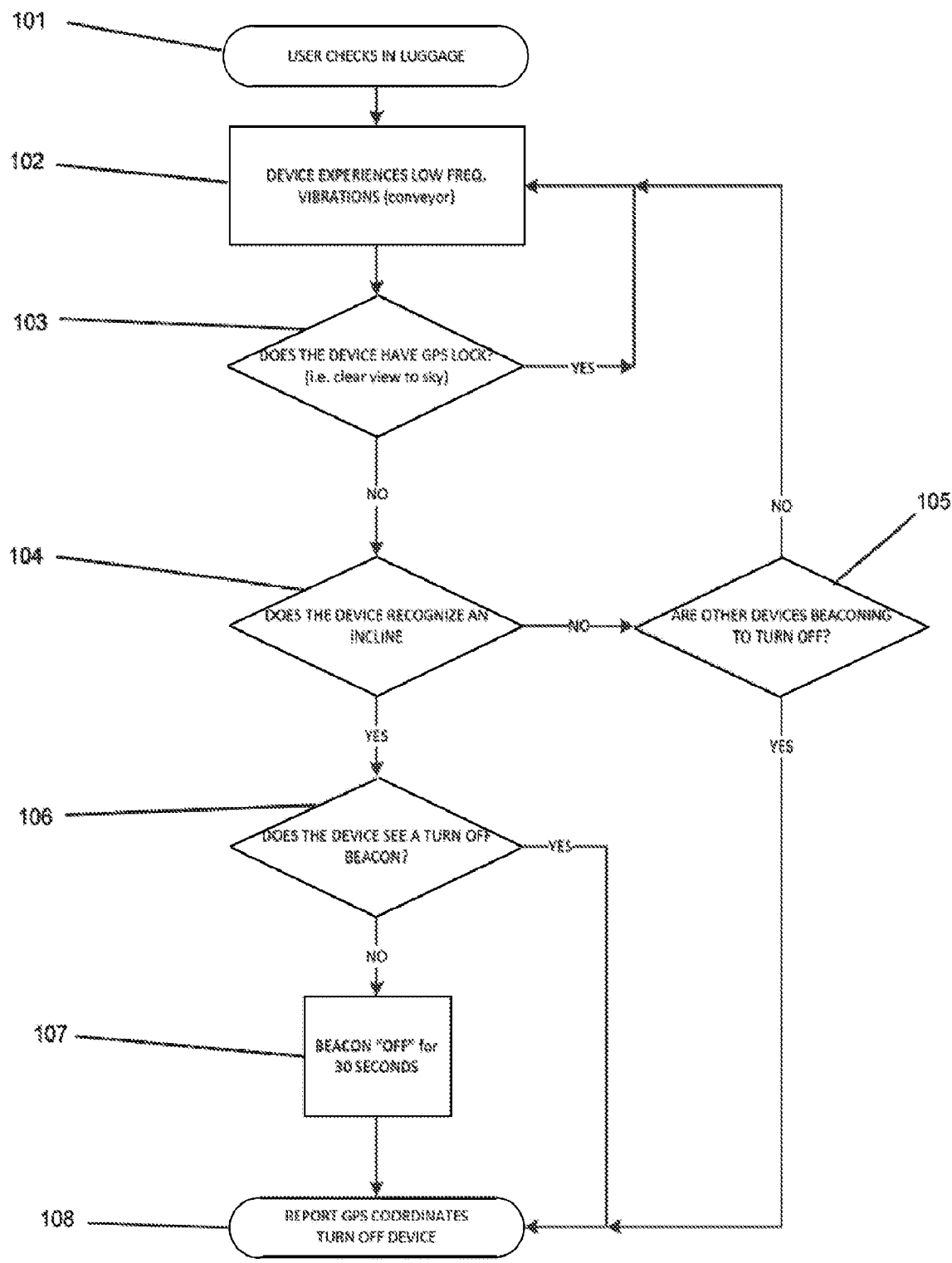
FIG. 1 is a flow chart showing the steps performed by an embodiment of the present luggage tracking device in order to shut down the device, either by turning it off completely or switching to a lower power mode.

As used herein, the following terms and variations thereof have the meanings given below, unless a different meaning is clearly intended by the context in which such term is used.

"Accelerometer" refers to a sensor that detects the acceleration of a device along one or more predetermined axes based on the force exerted on the sensor when it is accelerated. Preferably, the accelerometers used in the present device detects acceleration in 3 axes.

"Barometer" refers to a sensor that detects air pressure. Digital barometers comprising a pressure-sensing transducer are preferred.

"Bluetooth" refers to a wireless technology standard for exchanging data over short distances from fixed and mobile devices using UHF radio waves, generally within the band of between 2.4 and 2.485 GHz. Bluetooth communications preferably occur between devices within a distance of 10 meters, but may occur at distances of up to 100 meters. Bluetooth modules comprise circuitry to transmit and/or receive data using a Bluetooth standard (as certified under the BLUETOOTH trademark of Bluetooth SIG, Inc., Kirkland, Wash.).

"Cellular network" comprises a communication network in which at least the communication link between a device and the network is wireless, and in which the communications network is distributed over a plurality of base transceiver stations ("cells"). A cellular network communications module comprises circuitry to transmit and/or receive data wirelessly over a cellular network.

"CPU" and "processor" refer to the logic circuitry of a computer or other data processing device in which operations are controlled and executed. CPUs are generally implemented as integrated circuits.

"GPS" and "Global Positioning System" refer to a navigation satellite system that provides geolocation and time information to a receiver, usually in microwave frequency signals. GPS receivers generally require an unobstructed line of sight to GPS satellites in order to receive information from such satellites. In order for a GPS device to determine the location of the device based on GPS information, information from at least three GPS satellites, and from more preferably four or more satellites, is preferably first obtained. GPS modules comprise circuitry to receive signals from GPS satellites.

"GSM" refers to the Global System for Mobile Communication standard for cellular networks for mobile telephones. GSM modules and other cellular modems comprise circuitry to transmit and/or receive data over a cellular network.

"LPWAN" (Low-Power Wide-Area Network) refers to a long range, low power wide area network standard for wirelessly exchanging data. Typically, a LPWAN operates over radio frequency bands of less than one gigahertz and enables communications over up to 10 kilometers, and may use modulation to convey data. One example of a LPWAN is one which uses the LoRa standard (as implemented for example by LORA™ devices available from Semtech Corporation, Camarillo, Calif.). LPWAN modules comprise circuitry to transmit and/or receive data over a LPWAN.

"Magnetometer" refers to a sensor that measures the direction, strength, and/or relative change of a magnetic field at a particular location, in particular one which is incorporated into an integrated circuit. Such devices typically detect the effects of the Lorentz force, such as a change in voltage or resonant frequency, which may be measured electronically. Changes in voltage may be measured by a Hall effect sensor, i.e. a transducer that varies its output voltage in response to a magnetic field. Preferably, a 3-axis magnetometer is used in the present device.

"Memory" refers to computer memory in communication with the CPU which can store data and/or executable instructions. A variety of memory components can be used in the present device, and can include random access memory (RAM), read only memory (ROM), programmable ROM (PROM), erasable PROM (EPROM), and other types of memory known to those of skill in the art.

"Mobile communications device" and "mobile device" refer to devices such as mobile telephones which are able to transmit and receive data and which contain a memory and circuitry for data processing, such as a CPU.

"Radiotransparency" and "radiotransparent" refer to the characteristic of allowing the transmission of electromagnetic radiation.

"RFID" refers to radio-frequency identification. RFID systems generally include RFID tags, which contain electronically-stored information, and RFID readers, which obtain such information from RFID tags. RFID readers transmit an encoded radio signal to interrogate an RFID tag, and RFID tags are designed to receive such signals and then respond with information stored on the tag.

"RFID sensor" refers to a sensor that detects a radio signal of a predetermined frequency transmitted by an RFID reader device in order to detect when an RFID reader is being used.

"Wireless local area network" (WLAN) refers to a wireless computer network that links two or more devices using wireless communication within a limited area, e.g. within 60 meters. A WLAN communications module comprises circuitry to transmit and/or receive data wirelessly over a wireless local area network.

"WiFi" refers to a wireless local area network standard, such as the IEEE 802.11 standard and others certified by the Wi-Fi Alliance (Austin, Tex.). WiFi modules comprise circuitry to transmit and/or receive data using the WiFi standard, generally using radio waves of 2.4 GHz or 5.8 GHz over a distance of up to 60 meters.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise. Ranges which are described as being "between" two values include the indicated values.

Device

The present luggage tracking device 10 generally comprises a plurality of modules 100 used to provide communication and sensor functions. The modules 100 cooperate to turn the present device 10 off and on in response to a plurality of sensor inputs in order to safely track luggage, in particular during air travel, and in order to conserve power. The sensor inputs allow the present device 10 to determine its location as the device (usually placed within luggage) transits the baggage sorting process. Such sensor inputs include Bluetooth signals, atmospheric pressure signals, GPS signals, magnetometer readings, and accelerometer readings. The main components of the present device thus preferably include sensors such as a Bluetooth module 160, a barometer 140, a GPS module 180, an accelerometer 120, and a magnetometer 130, as well as communication modules such as a cellular modem (GSM module) 110 and WiFi module 190. Preferably, an RFID sensor 150 and a LWPAN (LoRa) module 170 are also included.

Bluetooth signals are transmitted and/or received by the Bluetooth module 160 using an appropriate radio transmitter/receiver in the device. These signals can be used by the present device for communicating with a mobile communications device of a user of the present system, such as when luggage is checked in. In addition, signaling using the Bluetooth standard can assist the present device in the determination of when to turn on or off all wireless communications. This functionality is enabled by versions of the Bluetooth standard (such as Version 4) that include the capability for devices to make use of a "Bluetooth Beacon," in which a Bluetooth module functions only as transmitter (like a "lighthouse") and transmits information without receiving information. When the present device 10 switches into "beacon mode," i.e. after it has determined that it has been stored in the cargo hold of an airplane, it transmits its GPS coordinates using a Bluetooth standard. All other luggage tracking devices (in particular those of the present invention) which are within reception range and which are configured to receive this beacon signal can be triggered to take action, such as to shut down or resume operation, upon receipt of the beacon signal, as described further below. Preferably, devices which receive the beacon signal compare the GPS coordinates sent in the beacon signal with GPS coordinates determined by the device receiving the beacon signal, and the receiving device initiates a shutdown process when the GPS coordinates sent by the beacon signal match the GPS coordinates broadcast by the beacon, i.e. are the same as or within 10-20 meters of the GPS coordinates of the GPS coordinates broadcast by the beacon.

A barometer 140 can also be included in the present device 10 in order to allow the device to determine when to turn on or off wireless communications and/or take other action. When the barometer 140 measures a predetermined decrease in pressure, for example, the present device 10 can be configured to turn off wireless communications, and/or the device can be configured to take other action in response to an increase in pressure sensed by the barometer 140.

Preferably, when the barometer 140 senses a decrease in atmospheric pressure of at least 2 pounds per square inch (psi)/13.8 kPa (kilopascals), the device is configured to turn off all wireless communication modules and cease transmitting any wireless signals. This provides a dual benefit. A passenger plane normally conducts a depressurization test in the plane's cargo hold after loading all luggage in which air pressure is reduced by at least 2 psi, in order to verify that all hatches and doors in the cargo area are closed tightly enough to maintain pressurization during flight. Such depressurization tests therefore can serve as a signal for the present device 10 to cease wireless transmissions and turn off communications modules before the plane pulls back from a departure gate. If this test is for any reason neglected and other components of the present device also fail to turn off communications modules, configuring the barometer 140 to turn off all wireless communication modules after sensing a 2 psi decrease in pressure serves as a "fail-safe" measure, in the event that other sensors do not shut down the communications modules of the present luggage tracking device prior to aircraft takeoff. This amount of pressure decrease corresponds approximately to the decrease in air pressure between sea level and 4,000 feet in altitude, and an aircraft hull is always pressurized to at least the equivalent of 8,000 feet, so the barometer's measurement of a 2 psi decrease in pressure due to the increase in altitude of a plane can be used to turn off the communications modules of the present device 10 either independently or in conjunction with other indicators described herein.

The present device 10 further includes a GPS module 180 for receiving signals from GPS satellites. Preferably, the GPS module is a passive receiver which only receives such signals. Such passive GPS devices do not have the ON/OFF restrictions that cell phones or GSM modems do during aircraft flight. GPS signals can be used by the present device 10 to determine when the device is exposed to the "clear sky," as GPS signals are received only when the device is in a sufficiently radiotransparent environment. A clear line of sight ("GPS lock") requires that a GPS signal be received from at least three satellites, and even more preferably from four or more satellites. This generally occurs in two places in the transit of luggage through a flight, namely upon entry to the aircraft (ascending a conveyor) and upon exit, when the luggage and device 10 are not within the hold of an aircraft or within an airport building. The present device 10 can therefore be configured to use the lack of reception of a GPS signal from one, two, three, four, or more satellites as one of the steps in the present method for determining when to turn on or off the communications modules of the present device 10. When the GPS module is not able to obtain a GPS lock, this is an indication that the device may be within a plane's cargo hold.

In a preferred embodiment, when each tracking device 10 receives GPS coordinates from the one or more satellites, the device preferably then transmits that information, such as via a GSM or other cellular network signal, to a networked ("cloud") server, such as via the internet. The networked server hosts a database which shares this information with a mobile app and/or with a website having an interface accessible to a user of the luggage tracking device 10. The database serves as a central depository that stores all the tracking, location, motion, and pressure information from the luggage tracking device.

An accelerometer 120 and magnetometer 130 are also included in the present luggage tracking device 10 in order to determine the type of motion that the present device experiences, which can also be used to determine when to turn on or off the communications modules of the present device. Preferably, the accelerometer 120 is a 3-axis accelerometer, i.e. it is able to measures acceleration in three axes, and may comprise a collection of 3 accelerometers (one for measuring acceleration along each of the 3 axes). Likewise, the magnetometer 130 is a 3-axis magnetometer, i.e. it is able to measures magnetic fields along three axes, with the 3 axes measured by the accelerometer 120 and the 3 axes measured by the magnetometer 130 preferably being the same axes (directions of measurement). By combining data from the accelerometer 120 and the magnetometer 130, the device 10 can determine if it is traveling in a horizontal direction, such as when it is on a conveyor or luggage transport vehicle of an airport, or whether it is ascending or descending on a conveyor, i.e. in to or out of a plane. The present device 10 can preferably be configured to use information from the accelerometer 120 and the magnetometer 130 indicating that the present device is ascending or descending, such as by a predetermined distance, to determine when to turn on or off the communications modules of the present device.

The accelerometer 120 and the magnetometer 130 can also be used to detect low frequency, low amplitude vibrations indicating that the device 10 is being moved on a conveyor. When the device is present in luggage traveling across the tarmac of an airport, for example, the accelerometer 120 would detect random, higher frequency motion with significant amplitudes due to the fast transport and the bumps that are hit as a luggage transport vehicle travels across the tarmac at high speeds relative to an airport luggage conveyor system. The present device 10 will experience much lower frequency and lower amplitude vibrations when placed on a conveyor, due to the slower speed of the conveyor. Such lower frequency and amplitude vibrations sensed by the accelerometer 120 and the magnetometer 130 can also be used to determine when to turn on or off the communications modules of the present device. Preferably, the present device 10 can be configured to turn on or off when the accelerometer 120 and/or the magnetometer 130 detect vibrations having a frequency of between 5 Hz and 40 Hz, more preferably vibrations of between 10 Hz and 30 Hz, such as vibrations of 20 Hz to 25 Hz, and also when the detected vibrations have an amplitude (relative to earth's gravitational pull, i.e. acceleration from gravity) of between 0.3 G and 0.7 G, more preferably of between 0.4 G and 0.6 G.

Other sensors can also be incorporated into the present device. For example, the device can include a temperature sensor, which can be configured to record temperature data when wireless communications are turned off. Preferably, an RFID sensor 150 is also included in the device 10. This sensor detects signals in frequencies used by an external RFID reader when it is attempting to read an RFID tag associated with luggage. Such signals typically have a frequency of 125 kHz to 134 kHz, 13.56 MHz, 433 MHz, or 860 MHz to 960 MHz, with other frequencies being possible. This sensor can be important, as RFID becomes a global standard for tracking bag tags and RFID reading is incorporated into the conveyers for the tracking of cargo being loaded or off-loaded from planes.

The present device 10 makes use of one or more communication modules for communicating with a mobile device such as a mobile telephone. Preferably, the present device includes a cellular network communications module 110, such as a cellular modem, comprising circuitry to transmit and/or receive data wirelessly over a cellular network. Preferably, cellular network transmissions are conducted using the GSM standard. The present device 10 further also preferably includes a wireless local area network (WLAN) communications module 190, comprising circuitry to transmits and/or receive data wirelessly. The WLAN module 190 is preferably a WiFi module that uses a WiFi standard. In some embodiments, a LPWAN communications module 170 can also be included in the present device 10, comprise circuitry to transmit and/or receive data over a LPWAN. Preferably, the LPWAN communications module 170 makes use of the LoRA technology standard to transmit and/or receive data, and is therefore a LoRa module. A LoRa module is advantageous in the present device 10, because it allows communications between the present device 10 and a mobile device equipped for LoRa communications to occur when the present device 10 is located in bag sorting areas of an airport which do not have good WLAN or cellular network communication coverage, such as when such sorting areas are in a basement. LPWAN can be used for both triangulation (position substitute for GPS when inside) and data communication.

Signal data collected by the present device is preferably transferred to a networked database, such as via a cellular network, which then communicates with local software (mobile apps, such as in IOS and/or Android formats) of a mobile device so the data of the device's location can be shared real time with users of the local software (app). App users can also login to a website which is directly connected to the cloud-based database to find tracking location info.

The modules, sensors, and other components of the present device are preferably contained within a housing 15, which also includes a power source such as a battery. Preferably, the power source is not flammable or susceptible to combustion. The modules, sensors, and other components of the device can be implemented as firmware, software, or a combination of both stored in memory 70 of the device, as is known to those of skill in the art. The firmware or software instructions for operating the device are processed by a CPU 50 in communication with the memory 70, which can be integrated into circuits with one or more other modules, sensors, and other components, although the present components can be placed into communication in any of a variety of ways known to the art. In addition to the housing, battery, and processing circuits, the present device further includes one or more antennas and other components needed for the operation of the above-described components of the present device. The housing 15 can further include an external on/off switch 12 and an LED light/display to indicate the status of the device.

Method of Operation

The present device 10 is configured to turn off wireless transmissions in order to avoid interfering with aircraft electronics and reduce energy requirements during transport, and to turn on wireless transmissions and reception functions upon arrival of the device (and any luggage containing or otherwise associated with the device) at a destination. The device preferably operates in cooperation with a software application on a mobile device such as a mobile phone, which communicates wirelessly with the luggage tracking device 10 to initiate an automatic shutoff process for wireless transmissions, such as through a command initiated through the app, for example when the luggage tracking device is about to be sent on a flight. Upon initiation of the shutoff process, the device 10 is configured to continue in its predetermined operational status, which may include transmission of current location information at predetermined intervals and/or performing other operations. The device is further configured, however, to turn off the transmission of data by the communications modules and the Bluetooth module upon the receipt of certain signals by sensors and/or by the Bluetooth module of the present device. The device may also cease other operations in response to such received signals and/or data, in order to further reduce power consumption.

As the device transits the luggage sorting process, it will experience motion and pressure changes as it transits different building levels, conveyors and even X-ray machines. However, the device will only have a GPS lock (i.e., a clear line of sight to GPS satellites) when it is outside the airport, and not yet within the cargo hold of a plane. In an embodiment of the present method, illustrated in FIG. 1, once a user checks in luggage at an airport (step 101) and activates the shutoff process, the device is configured to detect GPS signals and low frequency vibrations. When the GPS receiver obtains an active satellite lock, i.e. receives data from at least one, but more preferably from at least 2, 3, or 4 satellites, the present device preferably reports its position to a mobile device of the user, such as through a networked server in communication with an app on the user's mobile device, via a cellular modem 110 of the device 10.

The accelerometer 120 and the magnetometer 130 are configured to detect low frequency, low amplitude vibrations associated with a conveyor belt used to transport luggage into the cargo hold of a plane (step 102). Such vibrations can have a frequency of between 5 Hz and 40 Hz and an amplitude of between 0.3 G and 0.7 G, as described above. Once such vibrations are detected, the present device is configured to determine whether the GPS receiver is receiving GPS signals, which would indicate that the luggage is outdoors and not yet in the cargo compartment of a plane (step 103). If the low frequency, low amplitude vibrations associated with a conveyor belt have been detected and the GPS module does not have GPS satellite lock, then in one embodiment the present device 10 will cease transmission of signals by the communications module(s), including the Bluetooth module. If the GPS module has a GPS satellite lock, then the device will continue to monitor for the vibrations associated with a conveyor belt.

In a preferred embodiment, the present device will further determine if it has experienced movement in the upward direction, such as up an incline, as would occur during transport of luggage into the cargo hold of a plane (step 104), either after or in conjunction with detecting low frequency, low amplitude vibrations. Preferably, the incline comprises a ratio of distance to rise of between 5:1 and 7:1, preferably a ratio of 6:1. The device can in this case be configured to enter shutdown mode (ending transmissions) when this further step occurs together in conjunction with detecting low frequency, low amplitude vibrations and not detecting GPS signals from GPS satellites.

In addition, the present device can be configured to detect a decline in atmospheric pressure due to cargo hold pressurizing, such as a decline of at least 2 psi, as described above. Once the present device senses such a pressure decrease, it can be configured to enter shutdown mode, regardless of whether low-frequency, low amplitude vibrations or other indicators of the transport status of the device are detected. Alternatively, the device can be configured to enter shutdown when such a pressure decrease is detected together with detecting low frequency, low amplitude vibrations, the lack of a GPS signal, and/or the detection of inclined movement of the device.

In a preferred embodiment, after determining that the device has entered the cargo hold of a plane but prior to ceasing all wireless communications (step 108), the present luggage tracking device will transmit a Bluetooth signal, such as a signal comprising the device's location as determined by GPS, which indicates to other luggage tracking devices in the immediate vicinity of the device that it has been loaded into an aircraft cargo hold (step 107). Due to the short range of Bluetooth signals, other tracking devices which are within the range of the Bluetooth signal are most likely also within a plane's cargo hold, and therefore can be reliably signaled to enter a shutdown mode. For example, the present device can emit a signal for a predetermined amount of time, preferably for 30 seconds, as a "beacon" signal. This functionality assists other luggage tracking devices which are configured to respond to such a Bluetooth beacon signal by triggering them to cease all wireless communications.

In this regard, a luggage tracking device of the present invention which has not yet ceased transmitting signals will monitor Bluetooth communication signals for such a "beacon" signal being sent by another piece of luggage (steps 105 and 106). This is helpful for instance in case the device does not itself obtain a satellite lock (for example, if it is upside down and/or has no clear view to the sky). If the device does not have GPS lock, or does not properly detect an ascending conveyor belt, but receives such a beacon signal from an adjacent piece of luggage to turn off (step 105), the present luggage tracking device will initiate shutdown after reporting its GPS coordinates (step 108), such as to a networked server.

Figure 2:
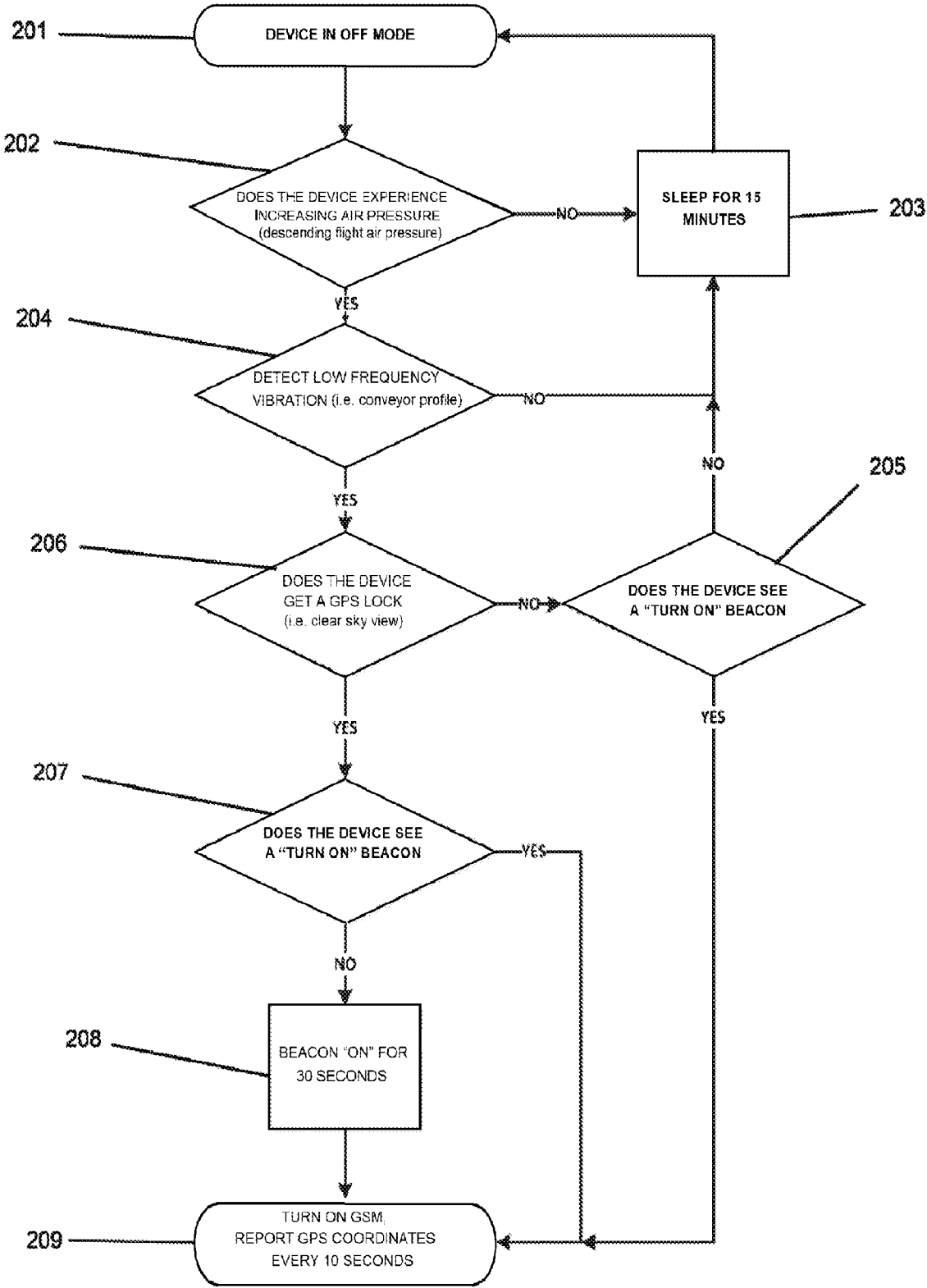
FIG. 2 is a flow chart showing the steps performed by an embodiment of the present luggage tracking device in order to turn on the device or resume operation following a flight.
Figure 3:
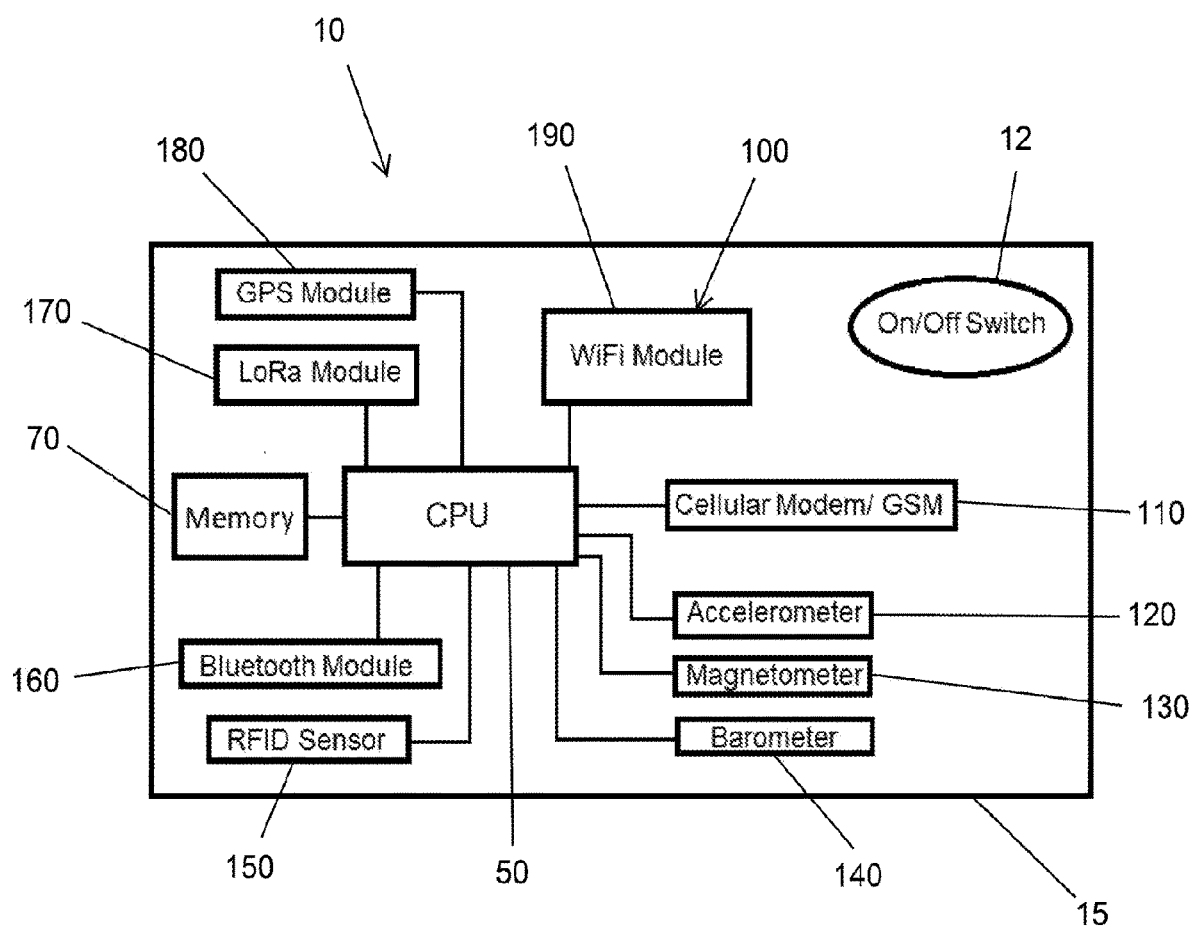
FIG. 3 is a schematic representation of an embodiment of the present luggage tracking device.

As illustrated in FIG. 2, in this "off" mode (step 201), the device will periodically measure atmospheric pressure (step 202). Atmospheric pressure will increase during descent and landing of a plane, and as this occurs the device will also periodically check the GPS receiver (step 206) and the accelerometer and magnetometer (step 204) for low frequency, low amplitude movement that would be indicative of a piece of luggage exiting the cargo hold of a plane on a conveyor belt, as described above (i.e., vibrations having a frequency of between 5 Hz and 40 Hz, more preferably vibrations of between 10 Hz and 30 Hz, such as vibrations of 20 Hz to 25 Hz, and also having an amplitude of between 0.3 G and 0.7 G, more preferably of between 0.4 G and 0.6 G). This movement could happen in flight, but a GPS lock will not occur in this case, which will prevent re-activation of GSM transmission of the device in its fully activated state. In one embodiment, the device proceeds to step (204) after detecting a predetermined pressure increase, such as an increase of 2 psi.

Once the cargo door is opened, a piece of luggage generally sits on a conveyor belt for approximately 35 seconds (as it descends from cargo hold to a trailer). During this time, the luggage experiences low frequency, low amplitude vibration (step 204), and obtains a GPS lock (step 206). The device will wake up, turn on the cellular modem and/or other communication modules, and report its location to the user of the present device (step 209). Preferably, the device will also send a Bluetooth beacon signal for 30 seconds at this point (step 208) to the other pieces of luggage, indicating that it has detected that it is being off-loaded. Other luggage tracking devices can be configured to react to this signal be initiating a startup mode.

If a device fails to obtain a GPS lock, and does not properly detect low frequency, low amplitude vibrations, the device will remain operative to receive a Bluetooth beacon signal with GPS coordinates from another luggage tracking device, indicating that it should turn on. Once such a beacon signal is received, the luggage tracking device will turn on, and will report its coordinates every 10 seconds.

EXAMPLES

Example 1

In one embodiment, illustrated in FIG. 1, the present device includes instructions in memory which can be executed to operate as follows:
1. Via a mobile phone application and Bluetooth, a user commands the luggage tracking device ("Device") to prepare for flight.
2. Device is embedded in luggage before or after step 1, and is checked in at an airline counter.
3. Devices waits for turn off "trigger(s)" (i.e. No GPS, low vibrations, and incline, or beacon);
4. Device experiences low-frequency, low-amplitude movement as detected by accelerometer (such as the movement caused by a conveyor belt).
5. Device's GPS receiver looks for GPS signal.
6. If the GPS receiver receives a GPS signal lock (as defined above), then the device returns to step 3. If the device cannot receive a GPS signal lock, then it proceeds to the next step.
7. If the device does not recognize a slight incline (i.e. loading into plane's cargo hold), preferably a ratio of distance to rise of 6:1, then it returns to step 6. If it senses such an incline, then it continues to the next step.
8. Device turns on its Bluetooth transmitter/receiver.
9. If a Bluetooth signal is received from another luggage tracking device without "triggers", then the devices proceeds to step 11. Otherwise, it proceeds to the next step.
10. Device emits a Bluetooth signal for 30 seconds which includes its GPS coordinates and which indicates to other luggage tracking devices that it is entering the cargo hold of an aircraft.
11. Device reports its GPS coordinates via its cellular modem and enters low power mode ("off" mode) in which the modem is placed into "aircraft mode," i.e. it is not operative to send or receive wireless signals.
12. If all the "triggers" are not received by the device with no GPS, vibrational, incline, or beacon signals, the device will use its atmospheric pressure sensor as a fail-safe and turn off when it senses the pressure decrease when the cargo hold of the plane is closed and pressure tested before the plane pulls away from the terminal.

Example 2

In another embodiment, illustrated in FIG. 2, the present device includes instructions in memory which can be executed to operate as follows:
1. While in low power/off mode the device will measure atmospheric pressure every 15 minutes; however, if the atmospheric pressure is the same as the previous measurement, or is decreasing, the device returns to step 1. If the air pressure is higher, then the device continues to the next step.
2. The device turns on (activates) the accelerometer and obtains measurements every 30 seconds.
3. If the accelerometer does not detect low-frequency, low-amplitude vibrations (e.g., from movement on a conveyor belt), then the device returns to step 2. If such low amplitude vibrations are detected, then the device continues to the next step.
4. Turn on the GPS receiver.
5. If the device does not achieve a GPS lock, then it returns to step 2. If a GPS lock is obtained, such as during unloading of the luggage from an aircraft, then the device reports its GPS coordinates over a cellular modem and then continues to the next step.
6. Device emits "beacon" signal as described above, including its GPS coordinates, for 30 seconds and awaits reconnections with user's phone via Bluetooth.
7. Device reconnects with the user's phone via a Bluetooth connection, and awaits commands.
8. Alternatively, regardless of above signals, if a Bluetooth signal ("beacon") is received from other luggage tracking devices which indicates that such other devices are being unloaded, then the luggage tracking device reports its GPS position via the cellular modem. The device waits reconnection via Bluetooth connection with users mobile app.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure.

Recitation of value ranges herein is merely intended to serve as a shorthand method for referring individually to each separate value falling within the range. Unless otherwise indicated herein, each individual value is incorporated into the specification as if it were individually recited herein. All references cited herein are incorporated by reference in their entirety.

What is claimed is:
1. A luggage tracking device, comprising:
   a communications module for transmitting and receiving data with a mobile device over a network selected from one or more of a cellular network, a wireless local area network, and a wireless wide area network;
   a global positioning system (GPS) module capable of receiving GPS signals from one or more GPS satellites;
   a Bluetooth module capable of transmitting and receiving data using a Bluetooth standard;
   a barometer;
   a 3-axis accelerometer;
   a 3-axis magnetometer;
   a memory;
   a central processing unit (CPU) in communication with the communications module, the GPS module, the Bluetooth module, the barometer, the 3-axis accelerometer, the 3-axis magnetometer and the memory; and
   instructions stored in the memory and executable by the CPU, wherein the CPU causes the instructions to operate to cease the transmission of data by the communications module and the Bluetooth module upon detection by the 3-axis accelerometer and the 3-axis magnetometer of vibrations having a frequency of between 10 Hz and 30 Hz and an amplitude of between 0.4 G and 0.6 G, and lack of reception by the GPS module of a GPS signal from at least three satellites.
2. The luggage tracking device of claim 1, wherein the communications module comprises one or more of a cellular network communications module, a wireless local area network communications module, and a wireless wide area network module.
3. The luggage tracking device of claim 1, wherein the wireless local area network communications module operates using a WiFi standard.
4. The luggage tracking device of claim 1, wherein the device includes a cellular network communications module and a wireless local area network communications module that operates using the standard.

5. The luggage tracking device of claim 1, wherein the wireless wide area network communications module operates using a LoRa standard.

6. The luggage tracking device of claim 1, further comprising radio frequency identification device (RFID) sensor.

7. The luggage tracking device of claim 1, wherein the Bluetooth module transmits and receives data using radio waves having frequencies between 2.4 GHz and 2.485 GHz.

8. A method for turning on wireless communications of a luggage tracking device, comprising the steps of:
  periodically detecting atmospheric pressure;
  upon detecting an increase in the atmospheric pressure of 2 psi, detect vibrations with an accelerometer and a magnetometer;
  upon detecting the vibrations having a frequency of between 5 Hz and 40 Hz and an amplitude of between 0.3 G and 0.7 G, determine whether a global positioning system (GPS) signal from at least 3 satellites is received; and then
  upon determining that the GPS signal from at least 3 satellites is received, begin transmitting signals from a communications module comprising circuitry for transmitting and receiving data over a network selected from one or more of a cellular network, a wireless local area network, and a wireless wide area network.

9. The luggage tracking device of claim 8, wherein the wireless local area network operates using a WiFi standard.

10. The luggage tracking device of claim 8, wherein the wireless wide area network operates using a LoRa standard.

\* \* \* \* \*